(12) United States Patent
Lutz et al.

(10) Patent No.: US 10,684,015 B2
(45) Date of Patent: Jun. 16, 2020

(54) COMBUSTION CHAMBER COOLANT FLUID PATH

(71) Applicant: Safran Aircraft Engines, Paris (FR)

(72) Inventors: Patrick François-Regis Lutz, Moissy-Cramayel (FR); Joseph Jean Marie Burguburu, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 487 days.

(21) Appl. No.: 15/427,140

(22) Filed: Feb. 8, 2017

(65) Prior Publication Data

US 2017/0227221 A1 Aug. 10, 2017

(30) Foreign Application Priority Data

Feb. 10, 2016 (FR) .................................... 16 51076

(51) Int. Cl.
| | |
|---|---|
| *F23R 3/60* | (2006.01) |
| *F23R 3/00* | (2006.01) |
| *F23R 3/50* | (2006.01) |
| *F23R 3/44* | (2006.01) |
| *F01D 25/28* | (2006.01) |
| *F02C 7/16* | (2006.01) |

(52) U.S. Cl.
CPC ................ *F23R 3/005* (2013.01); *F23R 3/44* (2013.01); *F23R 3/50* (2013.01); *F23R 3/60* (2013.01); *F01D 25/28* (2013.01); *F02C 7/16* (2013.01); *F23R 3/002* (2013.01)

(58) Field of Classification Search
CPC .. F23R 3/60; F23R 3/002; F23R 3/005; F01K 3/14
See application file for complete search history.

(56) References Cited

U.S. PATENT DOCUMENTS

| 2,709,338 A | * | 5/1955 | Morley | ..................... F23R 3/60 285/187 |
| 2,709,894 A | * | 6/1955 | Evans | ....................... F23R 3/60 60/757 |
| 2,748,567 A | * | 6/1956 | Dougherty | .............. F01D 9/023 60/39.37 |
| 3,086,363 A | * | 4/1963 | Fiori | ....................... F01D 9/023 60/39.37 |
| 4,118,136 A | * | 10/1978 | Corsmeier | ................ F01D 5/08 403/197 |

(Continued)

FOREIGN PATENT DOCUMENTS

| FR | 2 541 371 A1 | 8/1984 |
| FR | 2 921 463 A1 | 3/2009 |

(Continued)

*Primary Examiner* — Gerald L Sung
*Assistant Examiner* — Rene D Ford
(74) *Attorney, Agent, or Firm* — Blank Rome LLP

(57) ABSTRACT

A turbine engine including a combustion chamber having an inner annular shroud and an outer annular shroud that are coaxial with each other and that are connected at their downstream ends respectively to an inner annular link wall and to an outer annular link wall, for linking respectively to an inner casing and to an outer casing. At least a first one of the inner and outer annular link walls includes at least one coolant fluid circuit extending between the radially inner and outer ends of said first annular link wall.

11 Claims, 2 Drawing Sheets

(56) References Cited

U.S. PATENT DOCUMENTS

| | | | |
|---|---|---|---|
| 4,466,239 A | 8/1984 | Napoli et al. | |
| 4,805,398 A * | 2/1989 | Jourdain | F01D 5/082 236/93 R |
| 4,821,522 A * | 4/1989 | Matthews | F01D 9/023 415/175 |
| 6,769,257 B2 * | 8/2004 | Kondo | F01D 9/023 60/730 |
| 7,412,834 B2 * | 8/2008 | Bes | F23R 3/60 60/752 |
| 7,568,350 B2 * | 8/2009 | Kreder | F23R 3/50 60/796 |
| 2009/0077977 A1 * | 3/2009 | Cayre | F23R 3/06 60/757 |
| 2013/0074502 A1 | 3/2013 | Hada et al. | |

FOREIGN PATENT DOCUMENTS

| | | |
|---|---|---|
| WO | WO 01/31181 A1 | 5/2001 |
| WO | WO 2015/017180 A1 | 2/2015 |
| WO | WO 2015/023764 A1 | 2/2015 |

\* cited by examiner

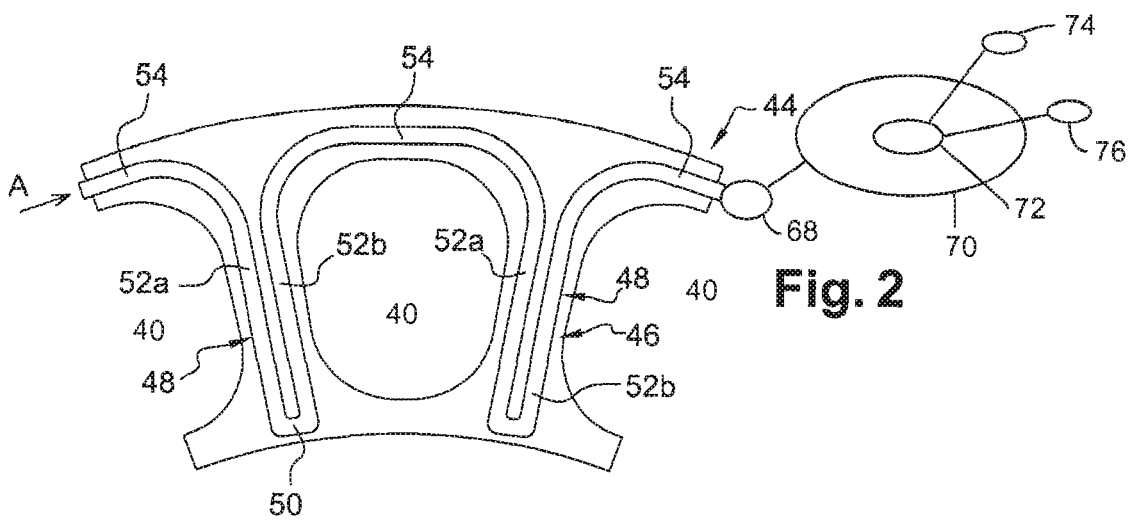
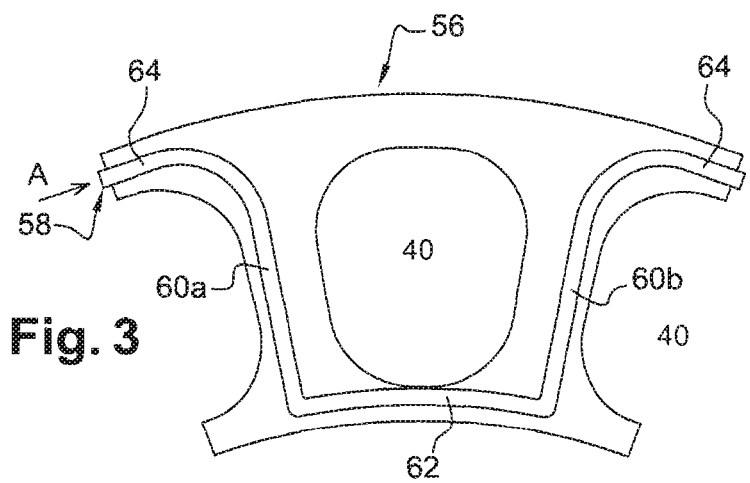
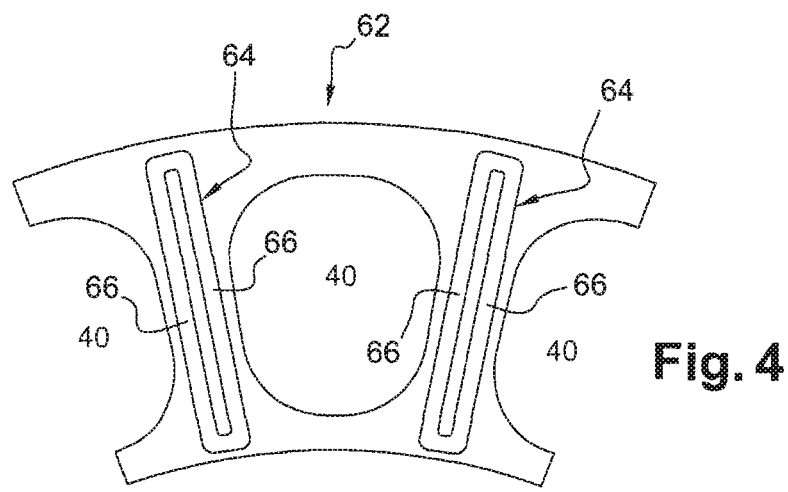

COMBUSTION CHAMBER COOLANT FLUID PATH

BACKGROUND OF THE INVENTION

1. Field of the Invention

The present invention relates to a turbine engine equipped with a combustion chamber.

2. Description of the Related Art

Going from upstream to downstream, a turbine engine comprises low-compression and high-compression stages feeding an annular combustion chamber, from which the combustion gases drive, at an outlet, a high-pressure turbine and a low-pressure turbine.

Conventionally, as shown in FIG. 1, an annular combustion chamber 10 comprises two annular shrouds, namely an inner shroud 12 and an outer shroud 14, extending coaxially about an axis 15 and interconnected at their upstream ends via an annular wall or "chamber end-wall" 16 provided with openings through which injector heads 18 can pass.

The downstream ends of the inner 12 and outer 14 annular shrouds are connected to inner 20 and outer 22 annular link walls for linking to an inner casing 24 and to an outer casing 26, respectively. In particular, the radially outer end of the outer annular link wall 22 comprises a radial annular flange 28 interposed and fastened by bolting between a radial annular flange 30 of the outer casing 26 and a radial annular flange 32 of the upstream end of a high-pressure turbine casing 34. The radial annular flange 30 of the outer casing 26 is formed by a shoulder thereof, the outer casing 26 being extended downstream from the combustion chamber so as to surround the casing 34 of the high-pressure turbine. The radially inner end of the inner annular link wall 20 comprises a radial annular flange 36 fastened by bolting to a radial annular flange 38 of the inner casing 24 of the combustion chamber 10.

The inner and outer annular link walls 20 and 22 for linking to the inner and outer casings 24 and 26 are provided with air passage openings 40 for bypassing the combustion chamber. In their downstream portions, the inner and outer shrouds 12 and 14 are provided with dilution holes 42 making it possible to bring in air from the high-pressure compressor for cooling the inner and outer annular shrouds 12 and 14, and thereby making it possible for heat to be conducted in the inner and outer link walls 20 and 22.

In operation, the inner casing 24 and the outer casing 26 are subjected to lower temperatures than the temperatures to which the inner and outer annular shrouds 12 and 14 of the combustion chamber are subjected. As a result, a temperature gradient is formed in the inner and outer annular link walls 20 and 22, between their ends where they meet the inner and outer annular shrouds 12 and 14, respectively, and their opposite ends where they meet the inner and outer casings 24 and 26. In addition, the presence of air bypass openings 40 causes the ends where the inner and outer link walls 20 and 22 meet the inner and outer casings 24 and 26 to cool, while the opposite ends of said walls, where they meet the inner and outer annular shrouds 12 and 14 are very hot. Finally, in operation, the link walls 20, 22 are subjected to strong mechanical stresses that, combined with the steep temperature gradient lead to the appearance of cracks that limit the lifespan of those parts.

In addition, in recent studies, it has been shown that the greater the extent to which the temperature gradient in a link wall 20, 22 varies, between its radially inner and radially outer ends, the shorter the lifespan of the link wall. Thus, in order to increase the lifespan of the inner and outer link walls, current art recommends lowering the temperature of the link walls 20, 22 at their ends where they meet shrouds of the combustion chamber and thus consists in forming holes in the inner and outer link walls 20 and 22 or in the downstream portions of the inner and outer annular shrouds 12 and 14. However, those solutions are not satisfactory.

SUMMARY OF THE INVENTION

An object of the invention is, in particular, to provide solution that is simple, effective, and inexpensive for solving the problems of cracks forming, with the aim of improving the mechanical strength and lifespan of the combustion chamber.

To this end, the invention provides a turbine engine including a combustion chamber having an inner annular shroud and an outer annular shroud that are coaxial with each other and that are connected at their downstream ends respectively to an inner annular link wall and to an outer annular link wall, for linking respectively to an inner casing and to an outer casing, said turbine engine being characterized in that at least a first one of the inner and outer annular link walls includes at least one coolant fluid circuit extending between the radially inner and outer ends of said first annular link wall.

Unlike the prior art, instead of cooling one and/or the other of the inner and outer link walls for linking to the inner and outer casing, the invention proposes to cause a coolant fluid to flow in the first link wall, more particularly in its thickness, in such a manner as to reduce the local variations in temperature in the link wall, and thus to increase its lifespan. Thus, the temperature varies substantially linearly, going radially from the inside to the outside, in a link wall, unlike in the prior art.

The at least one circuit preferably extends, at least in part, between air passage openings formed in said first link wall.

In a first embodiment of the invention, said first link wall includes a single coolant fluid circuit extending substantially through 360° and is made up of a plurality of first portions extending radially between the openings in said first link wall.

In a particular configuration of the first embodiment, each first portion has a U-shape formed by a bend portion connected to two branches that are substantially parallel to each other and that are connected at their ends opposite from the bend portion to second portions extending substantially circumferentially.

All of the bend portions may be arranged in the vicinity of the inner annular shroud or of the outer annular shroud to which the first link wall is connected.

Preferably, the circuit includes a motor, e.g. an electric motor, suitable for causing the coolant fluid to flow in the circuit. The circuit is connected to control means for controlling the speed of flow of the coolant fluid in the circuit.

Advantageously, the control means comprise a computer for controlling the speed of the motor, which computer is connected to a temperature sensor for sensing the temperature of the coolant fluid, and to a flowmeter.

The invention also provides a method of using the turbine machine as described above, said method consisting in actuating the fluid flow in the circuit of the first link wall when the flight phase corresponds to one of the phases comprising the takeoff phase and the cruising phase.

In practice the flight phases such as the takeoff and cruising phases correspond to phases during which the inner and outer link walls are subjected to the highest heat stresses, and during which it is thus preferable to actuate the fluid flow in the circuit. During takeoff, since the forward thrust must be at a maximum, the temperature of the chamber is then very high. The cruising phase is also a critical phase because it corresponds to the longest phase.

In a second embodiment of the invention, said first link wall includes a plurality of closed coolant fluid circuits that are mutually independent so that fluid cannot flow from one of them to another of them.

The heat exchange between the hot radial end of the first wall and its opposite radial end, which is relatively less hot, takes place by means of the vibration of the turbine engine while it is operating, which vibration makes it possible to move the coolant fluid in the closed circuits. This solution does not require energy to be taken from the turbine engine in order to operate, and therefore does not involve any extra fuel consumption.

Preferably, each closed circuit comprises two branches that extend substantially parallel to each other between the radially inner and outer ends of said first link wall.

BRIEF DESCRIPTION OF THE DRAWINGS

The invention will be better understood other details, characteristics, and advantages of the invention appear on reading the following description given by way of non-limiting example and with reference to the accompanying drawings, in which:

FIG. 2 is a diagrammatic view of a first embodiment of a fluid circuit formed in an outer link wall;

FIG. 3 is a diagrammatic view of a variant of the first embodiment of the invention; and FIG. 4 is a diagrammatic view of a second embodiment comprising a plurality of fluid circuits formed in an outer link wall.

DETAILED DESCRIPTION OF THE PREFERRED EMBODIMENTS

Figure 1:
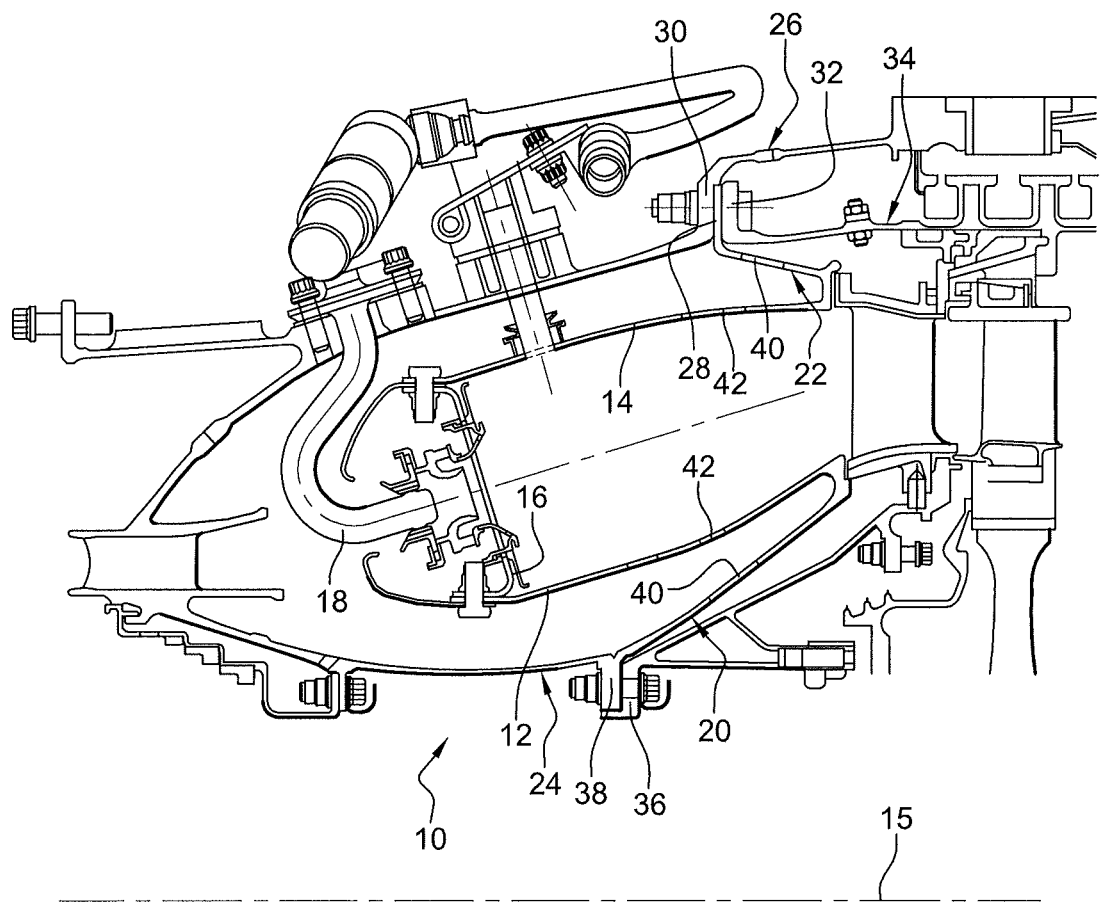
FIG. 1 is a diagrammatic section view of a prior art combustion chamber, described above.

Since FIG. 1 shows a combustion chamber of a known type that is described above, reference is made below to FIG. 2, which shows a first embodiment of the invention.

Unlike the prior art, the invention proposes to reduce the heat stresses in the inner and outer link walls 44, by incorporating at least one coolant fluid circuit 46 into them, the circuit 46 extending at least between the radially inner and outer ends of the wall 44 and being formed in its thickness.

The coolant fluid circuit is fluidically isolated from the air circulating around the combustion chamber through the orifices 40 of the inner and outer link walls.

In a first embodiment of the invention shown in FIG. 2, the outer link wall 44 includes a single coolant fluid circuit 46 extending through 360° about the axis of the turbine engine. The coolant fluid circuit 46 comprises a plurality of first portions 48 extending radially between the air passage openings 40 in the outer annular link wall 44. Each of these first portions 48 is U-shaped, made up of a bend portion 50 connected to two branches 52a, 52b that are substantially parallel to each other. The bend portions 50 are all arranged in the vicinity of the outer annular shroud 14 (see FIG. 1) and the ends of the branches 52a, 52b of each first portion 48 that are opposite from the bend portions 50 are connected to second circuit portions 54 that extend substantially circumferentially. Thus, each second circuit portion 54 extends circumferentially, radially outside relative to an opening 40 in the outer link wall 44.

In this embodiment, the fluid flowing, for example, as indicated by arrow A, is colder in the branch 52a than in the branch 52b.

In a variant of the FIG. 2 embodiment, it is possible to place the bend portions 50 in the vicinity of the outer casing 26, the ends of the branches 52a, 52b that are opposite from the bend portions then being connected to second portions 54 extending circumferentially in the vicinity of the outer annular shroud 14, radially inside relative to the opening 40.

In another variant, the outer link wall 56 may include a circuit 58 of a different shape. Thus, it is possible for each of the first portions 60a, 60b of the circuit 58 to be formed of a single branch (FIG. 3). Thus, each first portion 60a, 60b is connected at its radially inner end and at its radially outer end to a second portion 62 extending circumferentially, a second portion 62 being arranged radially inside relative to an opening 40 and a second portion 64 being arranged radially outside relative to an adjacent opening 40. In practice, the second portions 62, 64 are thus arranged annularly in staggered manner in succession and interconnected via the first portions 60a, 60b.

In this embodiment, the fluid flowing as indicated by arrow A, is colder in the branch 60a than in the branch 60b.

While not illustrated in FIG. 3, of the circuits 46, 58 of FIGS. 2 and 3 has a member 68 for causing the coolant fluid to flow, it being possible for said member to be a motor, e.g. an electric motor. Advantageously, each circuit is connected to control means 70 comprising a computer 72 for controlling the speed of the motor 68, which computer 72 is connected to a temperature sensor 74 for sensing the temperature of the coolant fluid and to a flowmeter 76.

In operation, the coolant fluid flowing through the circuit 46, 58 makes it possible to transfer a fraction of the heat from the radially inner end of the outer link wall 44, 56 towards its radially outer end. It can thus be observed that the maximum amplitude of the temperature gradient is considerably smaller than in the prior art, thereby resulting in the local variations in temperature being smaller and making it possible to increase the lifespan of the link wall.

In a second embodiment of the invention, the outer link wall 62 may include a plurality of closed coolant fluid circuits 64, which circuits 64 are mutually independent so that fluid cannot flow from one of them to another of them. As shown in FIG. 4, each circuit 64 extends radially between two successive openings 40 in the outer link wall 62. Each circuit 64 comprises two branches 66 that are substantially parallel to each other and that are interconnected at their radially inner ends and at their radially outer ends. In this embodiment, the fluid flow in each circuit 64 takes place via vibration while the turbine engine is operating. In the same way as in the preceding embodiment, the reduction in the amplitude of the temperature gradient leads to an improvement in the mechanical strength, over time, of the outer link wall 62.

Although the invention is described above with reference to an outer link wall 44, 56, 62, it can be understood that it is also possible, without going beyond the ambit of the invention, to form one or more fluid circuits as described with reference to FIGS. 2, 3, and 4, in an inner link wall.

The coolant fluid should preferably be non-inflammable and be a good heat carrier. It is therefore possible to choose water as the coolant fluid. In the event of leakage of the coolant fluid from the fluid circuit, water flowing through the combustion chamber then corresponds to a situation of water being ingested by the turbine engine, the turbine engine being designed to cope with such a contingency.

In the configurations shown in FIGS. 2 and 3, it is desirable for the fluid to be caused to flow in the circuit 46, 58 only during flight phases such as take-off and cruising that correspond to phases during which the inner and outer link walls are subjected to the highest heat stresses. Conversely, during the less critical flight phases, such as descent, slowing down on the ground, or landing, the fluid flow in the circuit may be stopped.

The invention claimed is:

1. A turbine engine including a combustion chamber having an inner annular combustion chamber liner and an outer annular combustion chamber liner that share an axis, wherein a downstream end of the inner annular combustion chamber liner is connected to an inner annular link wall for linking with an inner casing, wherein a downstream end of the outer annular combustion chamber liner is connected to an outer annular link wall for linking to an outer casing, wherein at least a first one of the inner and outer annular link walls includes at least one coolant fluid path extending between a radially inner end of the first annular link wall with respect to the axis and a radially outer end of said first annular link wall with respect to the axis, said at least one coolant fluid path is fluidically isolated from air circulating around the combustion chamber and around the first annular link wall.

2. A turbine engine according to claim 1, wherein said at least one coolant fluid path extends between air passage openings formed in said first annular link wall.

3. A turbine engine according to claim 2, wherein the at least one coolant fluid path includes a single coolant fluid path extending through 360°, the single coolant fluid path including a plurality of first portions extending, radially with respect to the axis, between the air passage openings in said first annular link wall.

4. A turbine engine according to claim 3, wherein each first portion has a U-shape formed by a bend portion connected to two branches that are parallel, wherein ends of the two branches opposite from the bend portion are connected to second portions extending circumferentially with respect to the axis.

5. A turbine engine according to claim 4, wherein all of the bend portions are arranged along an edge of the first annular link wall connected to the inner annular combustion chamber liner or to the outer annular combustion chamber liner.

6. A turbine engine according to claim 5, wherein the single coolant fluid path includes a motor suitable for causing coolant fluid to flow in the single coolant fluid path, and the single coolant fluid path is connected to control means for controlling the speed of flow of the coolant fluid in the single coolant fluid path.

7. A turbine engine according to claim 6, wherein the control means comprises a computer for controlling a speed of the motor, wherein the computer is connected to a temperature sensor for sensing a temperature of the coolant fluid, and to a flowmeter.

8. A turbine engine according to claim 1, wherein the at least one coolant fluid path includes a plurality of closed paths that are independent of each other so that fluid cannot flow from one of the plurality of closed paths to another of the plurality of closed paths.

9. A turbine engine according to claim 8, wherein each closed path of the plurality of closed paths comprises two branches that extend parallel to each other between the radially inner end and the radially outer end of said first annular link wall.

10. A method of using the turbine engine according to claim 7, comprising actuating fluid flow in the single coolant fluid path of the first annular link wall when a flight phase corresponds to one of a takeoff phase and a cruising phase.

11. A turbine engine according to claim 1, wherein said coolant fluid is a liquid.

* * * * *